(12) United States Patent
Ward et al.

(10) Patent No.: US 6,932,751 B1
(45) Date of Patent: Aug. 23, 2005

(54) APPARATUS AND METHOD FOR MAKING BAGS OF DIFFERENT DIMENSIONS

(75) Inventors: Simon Robert Ward, Hamilton (NZ); John Paul Koke, Hamilton (NZ)

(73) Assignee: Sealed Air New Zealand, Hamilton (NZ)

( * ) Notice: Subject to any disclaimer, the term of this patent is extended or adjusted under 35 U.S.C. 154(b) by 0 days.

(21) Appl. No.: 09/445,640

(22) PCT Filed: Jul. 3, 1998

(86) PCT No.: PCT/NZ98/00094

§ 371 (c)(1),
(2), (4) Date: May 8, 2000

(87) PCT Pub. No.: WO99/02409

PCT Pub. Date: Jan. 21, 1999

(30) Foreign Application Priority Data

Jul. 7, 1997 (NZ) ...................................... 328269

(51) Int. Cl.[7] .............................................. B31B 1/00
(52) U.S. Cl. ........................................ 493/25; 493/187
(58) Field of Search .......................... 53/503, 504, 411, 53/202, 461, 477, 373.7, 375.9; 493/25, 187, 493/189, 194, 199

(56) References Cited

U.S. PATENT DOCUMENTS

| | | | |
|---|---|---|---|
| 3,607,574 A | 9/1971 | Satake et al. ............... | 156/515 |
| 3,701,318 A * | 10/1972 | Lozeau et al. .............. | 101/336 |
| 3,724,167 A * | 4/1973 | Pizmoht | |
| 4,505,092 A * | 3/1985 | Bowers et al. ................ | 53/504 |
| 4,516,385 A * | 5/1985 | Lenker et al. | |
| 4,539,794 A * | 9/1985 | Azzaroni | |
| 4,546,595 A | 10/1985 | Yasumune et al. ............ | 53/450 |
| 4,586,318 A | 5/1986 | Litt et al. ...................... | 53/459 |
| 4,631,905 A | 12/1986 | Maloney ....................... | 53/554 |
| 5,062,253 A | 11/1991 | Bacon et al. ................. | 53/451 |
| 5,086,609 A | 2/1992 | Tetenborg .................... | 53/452 |
| 5,205,104 A * | 4/1993 | Nakashima et al. | |
| 5,282,351 A | 2/1994 | Tetenborg .................... | 53/459 |
| 5,299,410 A * | 4/1994 | Freeman | |
| 5,328,438 A * | 7/1994 | Crowley | |
| 5,423,162 A * | 6/1995 | Chiu | |
| 5,435,113 A * | 7/1995 | Oikawa | |
| 5,463,851 A | 11/1995 | Nagai ........................... | 53/552 |
| 5,618,252 A | 4/1997 | Melville ....................... | 493/22 |
| 5,655,356 A * | 8/1997 | Ginestra et al. | |
| 5,816,990 A | 10/1998 | Melville ....................... | 493/22 |

FOREIGN PATENT DOCUMENTS

| | | |
|---|---|---|
| AU | 1997/44047 B2 | 10/1997 |
| DE | 2 036 004 | 1/1972 |
| DE | 20 36 004 | 1/1972 |
| DE | G 93 11 290.4 | 7/1993 |
| NZ | 140305 | 12/1963 |
| NZ | 140846 | 2/1965 |
| NZ | 263260 | 3/1997 |
| NZ | 305371 | 3/1999 |

* cited by examiner

*Primary Examiner*—Eugene Kim
(74) *Attorney, Agent, or Firm*—Mark B. Quatt

(57) ABSTRACT

This invention relates to packaging apparatus and a method which enables bags of different widths and lengths to be produced so as to enable products of varying sizes to be packaged in those bags.

13 Claims, 4 Drawing Sheets

APPARATUS AND METHOD FOR MAKING BAGS OF DIFFERENT DIMENSIONS

TECHNICAL FIELD

This invention relates to bag making dispensing apparatus.

BACKGROUND ART

Packaging apparatus for providing packaging for products of various sizes is known. A representative sample of this apparatus is discussed below.

U.S. Pat. No. 3,553,934 (Johnson) discloses machinery that makes bags of different widths and lengths from folded film dispensed by a single dispenser.

Unfortunately, there are a few problems with this apparatus. If products are of varying sizes, then the depth of the folded film must be such that larger bags for accommodating larger products can be made. However, when smaller bags are cut from the film there is considerable wastage.

U.S. Pat. No. 4,179,055 (Milner) discloses a device having several supply rolls each having continuous strip of plastic material in the form of bags connected to each other at scored lines. The bags are of differing size from roll to roll. A problem with this device is that there is no flexibility provided by the user in choosing bag length. Only discrete lengths are available according to which supply roll is chosen. Thus, it is possible that products of greater length than average could not be provided with a bag of sufficient size to contain the products. Alternatively, there may be considerable wastage occurring as a result of only discrete lengths being able to be chosen.

A similar problem is present in the apparatus disclosed in U.S. Pat. No. 4,425,988 (Amplas, Inc). This discloses apparatus that makes bags of varying lengths from tubular lay flat film. However, the width of the tubular lay flat film restricts the overall bag size and variations that can be offered. Again wastage occurs.

U.S. Pat. No. 4,505,092 (Hobart Corporation) discloses apparatus which addresses the wastage problem. This apparatus has two film dispensers containing stretch wrap film of different widths. Product passes through the apparatus prior to being packaged. If the product activates either a discrete height or width mechanical sensor, then the product is wrapped in the film having the greater width.

Unfortunately, this apparatus is not suitable for all situations. For the pack to be airtight seals must be formed through wrinkle-free areas of the film and show no weakness at the intersection of seals. Folding of film into a wrinkle free format suitable for airtight seals is relatively easy with regular rectangular shaped products but extremely difficult with irregular shaped products such as cuts of meat.

Often it is preferred to place product into a discrete sized package. If this package is made from shrink film, then the film can be heated to cause the film to shrink around the product, forming intimate contact which gives an anesthetically pleasing appearance to the packaged product.

Another problem with this apparatus is that it cannot be used for packaging as a post process. That is, the product must pass through the wrapping machine to be packaged. This is in contrast to packaging as a post process whereby the package is substantially formed before product is inserted into it.

It would be desirable if the packaging could be provided for products of varying size which are then later on placed in that packaging. This is particularly useful if the products are of a large size or awkward shape which cannot be readily fed through a packaging machine. Seals should be minimised providing for subsequent airtight (vacuum) packaging.

Yet another problem with the apparatus disclosed in U.S. Pat. No. 4,505,092 machinery is that the discrete mechanical sensors are only of value in selecting the width of film to be used when the products are of a regular shape. This is because an irregular shaped product may not trigger the mechanical sensors, yet still be of a size requiring the greater film width.

It is an object of the present invention to address the above problems, at least provide the public with a useful choice.

Further objects and advantages of the present invention will become apparent with the following description which is given by way of example only.

DISCLOSURE OF INVENTION

An apparatus for providing packaging for products of varying sizes including
a) a first and second film source, each film source having film of a defined width, wherein the width of the first film source is different from the width of the film of the second film source; and
b) the means for selecting a film source based on the size of the product to be packaged, the apparatus characterised in that the film of the first film source, and the film of the second film source are each in the form of a tubular lay flat film The film sources may be in any suitable format.

For example, the film sources may have film presented in a flip-flop configuration, that is the film is substantially flat and repeatedly folded back on itself in accordion like fashion.

However, preferred embodiments of the present invention each film source has film wound on to a roll.

Reference throughout the specification should now be made to use of the present invention with two film sources. However, it should be appreciated that the present invention can use more than two film sources depending on the desired end use.

The film used may be any type, but preferably is a polymeric, thermoplastic film, or preferably a heat shrinkable film.

The means for selecting the film source can be in any appropriate form and will typically use standard control technology including, eg a programmable logic control (PLC) and switching means.

The use of at least two film sources each having tubular lay flat film of different widths overcomes a number of the problems associated with the prior art.

The ability to choose the width of the tubular lay flat film based on the size of product saves considerably on wastage.

Another advantage of the present invention is that the use of tubular lay flat film enables discrete bags to be formed. The term bag includes film enclosures including end sealed and side sealed bags, pouches, casings etc.

Discrete bags enable product to be placed into the bag after the bag has been formed. This enables products having large sizes or irregular shapes to be readily packaged without passing through the machinery that forms the package as such.

Another advantage of the present invention is that the tubular lay flat film can be oriented and rendered heat shrinkable during the manufacture of the film. Thus, after a product is placed into a package made from heat shrinkable tubular lay flat film, and evacuated, the film can be heated to induce shrinkage of the film, eg, by hot air or hot water, and provide intimate contact of the film with the product providing an aesthetically pleasing presentation.

In a preferred embodiment of the present invention, the packaging apparatus also includes a means for selecting the length of the film. This means enables the machine to dispense different lengths of tubular lay flat film. Thus, this mechanism enables even greater flexibility in the size of the package that can be produced by the machine, as a package can have variable width and length.

The widths of the film chosen will naturally be discrete according to which film source is used. However, while discrete lengths are also possible, the invention in some embodiments allows the lengths to be infinitely adjustable, giving considerable flexibility in product package size.

It should be appreciated that by having the ability to place the product in the package after the package is created, the dimensions of the package can be chosen to allow for product orientation, that is, a package size can be chosen so that there is minimal wastage of space when the product is orientated correctly within the formed bag or other package type.

While it is possible that some embodiments of the present invention may provide for an open ended tube for use in the package, preferred embodiments include a means for sealing to create a seal along one end of the dispensed tube stock. Thus, the present invention can provide bags which are open only at one end allowing for the later insertion of product.

The package can be separated from the film dispenser in a number of ways, including a hot wire, manual use of a knife and so forth. However, in preferred embodiments, the packaging apparatus includes a cutting mechanism for cutting the dispensed tubular lay flat film.

One or more means for cutting and/or sealing can also be used beneficially in connection with the present invention. For example, film from the selected film source can be moved to a single cutting/sealing mechanisms.

Alternatively there may be a cutting/sealing mechanism for each film source—or any other ratio as required.

There can alternatively be a cutting means and a separate, discrete, sealing means.

While the present invention may in some embodiments use discrete mechanical switches to trigger the length and/or width selection mechanisms, this is not particularly useful if the product to be packaged is of an irregular shape.

Therefore, in some embodiments there is provided manual input means enabling the user of the packaging apparatus to use the width and/or length selection mechanism.

For example, an operator of the packaging apparatus may view the product to be packaged and manually select which film dispenser to use (and hence the width of the tubular lay flat film) and/or choose the length—to provide a package of an appropriate size for the product. With time, a manual operator can assess the required length and width parameters quickly and accurately.

In addition to, or instead of the manual input means, some embodiments of the present invention can include remote sensing to determine product size and control means to operate the means for selecting the first and second film source and thus select the desired width and/or length.

The remote sensing can be in any suitable form including any sensing means conventionally known in the art. For example, the remote sensing may include infra-red, capacitive, ultrasonic, optical or any other suitable sensors. The remote sensing means can obtain information about the product size to enable the appropriate bag size to be selected. For example, the height of the product is just as important as the width of the product in determining the width of the film to be selected. The same is true for the length of the product.

Once the sensors means has determined the product size, this information can be provided to the control means to operate the means for selecting the first and second film source and produce a package of a suitable size for the product.

In preferred embodiments of the present invention there is provided some intelligence in the machine that takes into account possible orientation of the product within the package, thus choosing the smallest package size possible to fit a product of the parameters sensed.

The machine can be operated on a continuous, intermittent or on-demand basis as required.

In some embodiments of the present invention there may be provided a printer which can print onto the film.

Printers are a considerable expense and also bulky. Therefore in preferred embodiments only one printer is supplied for each packaging apparatus. Thus, there may be provided a printer shuttle means which enables the printer to move to the required film dispenser.

Alternatively, film from the chosen film source may be moved to a single printer instead.

According to another aspect of the present invention, there is provided a method for providing packaging for product of various sizes using an apparatus including a first and second film source, each film source having film of a defined width, wherein the width of the film of the first film source is different from the width of the film from the second film source; characterised by the steps of:

a) determining the size of the product to be packaged, and b) using a means for selecting a film source to determine from which source film is to be used in accordance with the product size, and c) using a means for selecting a film length to determine the length of the film to be dispensed in accordance with the product size, and d) dispensing film of the required length and width, and e) sealing the film, and f) cutting the film to produce a package of the desired length.

BRIEF DESCRIPTION OF THE DRAWINGS

Aspects of the present invention will now be discussed by way of example only with reference to the accompanying drawings in which.

BEST MODES FOR CARRYING OUT THE INVENTION

Figure 1:
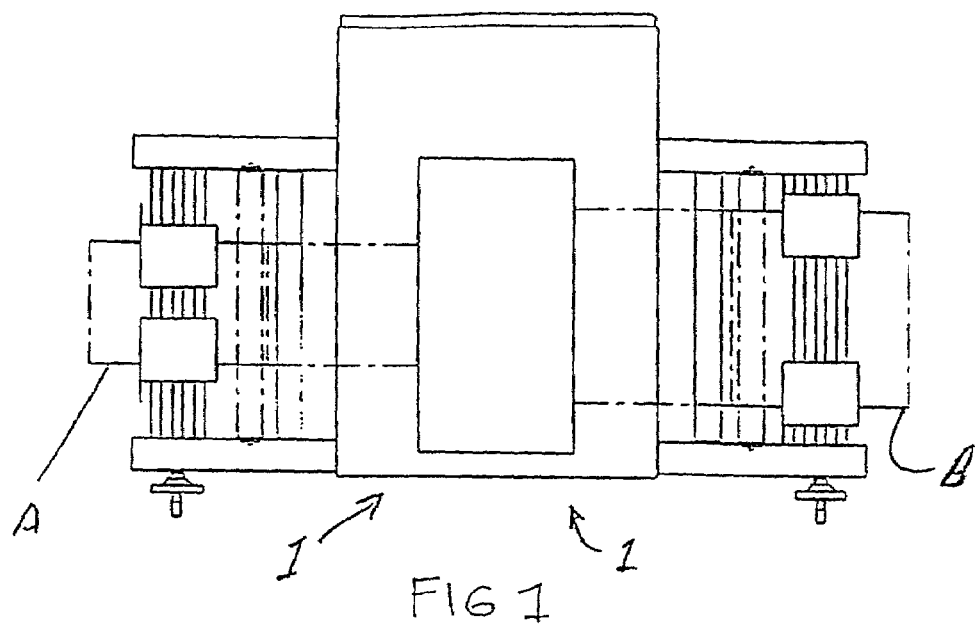
FIG. 1 is a planned view of an apparatus in accordance with one embodiment of the present invention.

FIG. 1 illustrates packaging apparatus in accordance with the present invention having two film dispensers A and B.

The free ends of the film 2 (see FIGS. 2 and 3) are fed from the film sources in the form of rolls A and B adjacent sealing and cutting heads generally indicated by arrow 1. Each of the sealing and cutting heads provides means by which a transverse seal can be made in the film 2 and the film subsequently cut. The relative positions of the sealing and cutting means determine the bag orientation, that is, whether the bag is dispensed opened or closed end first.

In this embodiment, as bags are dispensed on a vertical plane it is preferable for the ends of the formed bags to be temporarily secured by gripping means such as rolls, clamps or suction cups (not shown).

Figure 3:
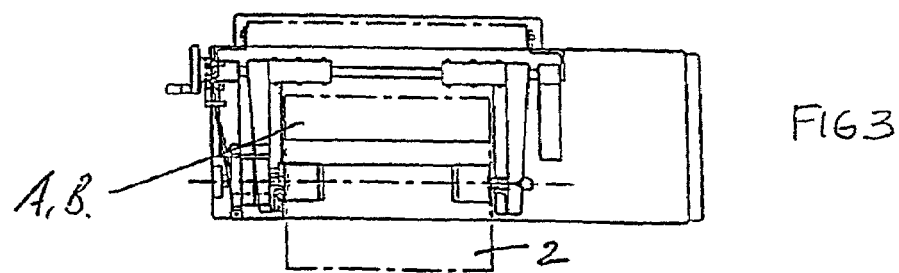

It should be appreciated that in FIG. 3 only roll A can be seen as the view is looking from the left end of the apparatus shown in FIG. 1.

Figure 2:
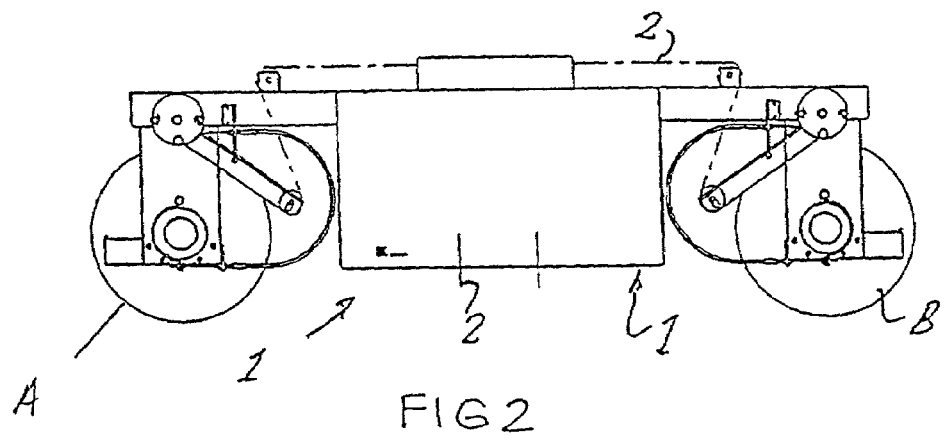
FIGS. 2 and 3 are side and end views respectively of FIG. 1.
Figure 4:
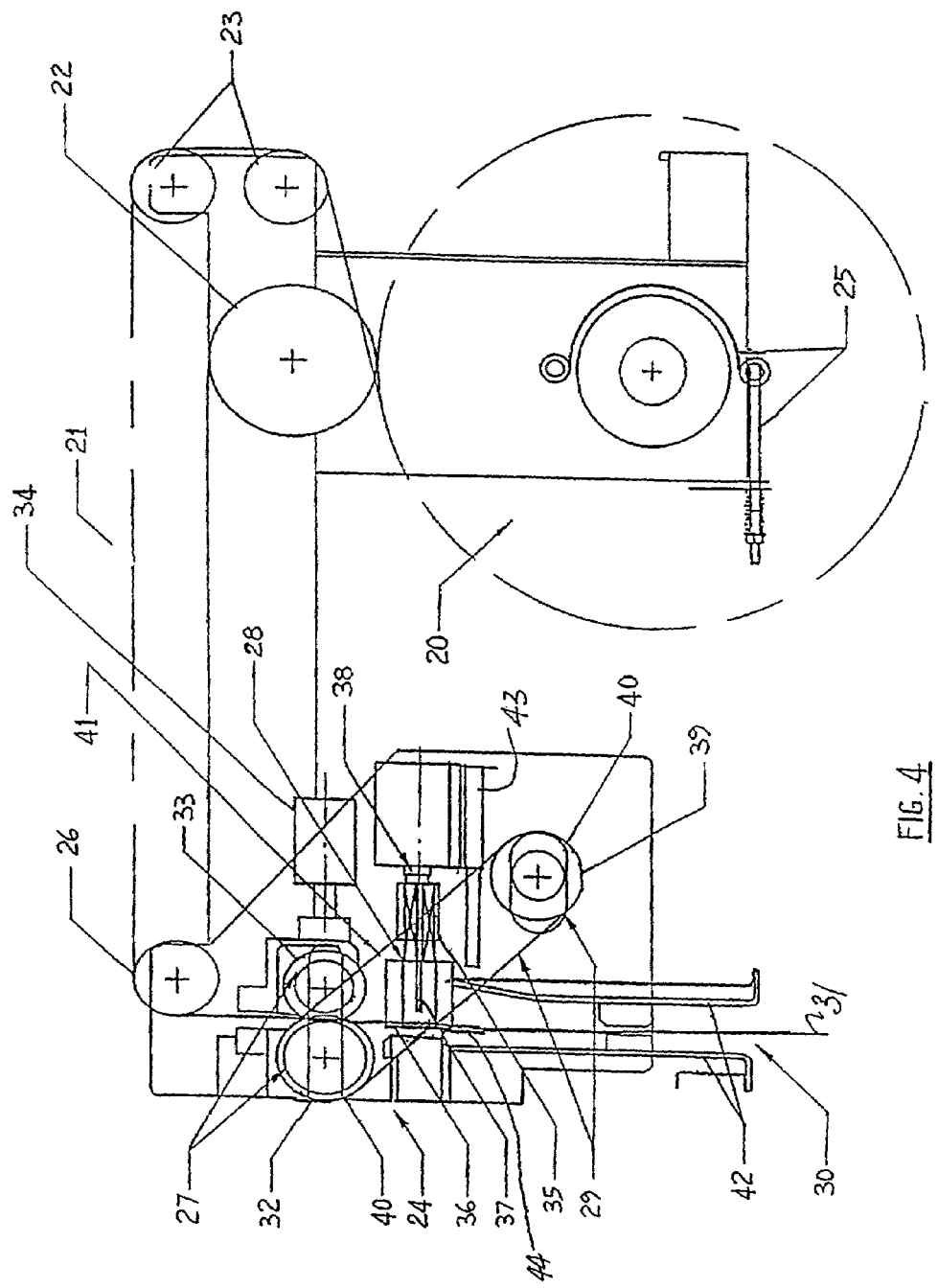
FIG. 4 is a general elevation view of one component of an adjacent set of sealing and cutting apparatus of the present invention.

FIG. 4 is a detailed side view of one half of the apparatus illustrated in FIGS. 1, 2 and 3.

A support arrangement generally indicated by arrow 20 is provided for a roll of tubular lay flat film 21. The tubular lay flat film 21 is fed via rollers 22, 23 to a sealing and cut assembly generally indicated by arrow 24.

The support arrangement 20 is provided with a braking means in the form of an adjustable shoe brake arrangement 25.

The sealing and cutting assembly 24 includes an alignment roller 26, a nip roller assembly indicated by arrow 27, a sealing and cutting head indicated by arrow 28, drive means generally indicated by arrow 29 and dispensing means generally indicated by arrow 30.

In this embodiment, the nip roller assembly 27 includes a fixed roller 32, a reciprocal roller 33 which can be advanced and retracted relative to the fixed roller 32 by cylinder 34. The assembly further includes a clamping and sealing head 35, anvil 36 and a cutter 37. The head 35 and cutter 37 are advanced and retracted by a cylinder 38.

The drive 29 includes a motor 39, and a transmission including wheels 40, and a belt 41.

Dispensing means 30 includes two spaced wall members 42 defining a passage for a bag 31 formed by the sealing and cutting head 24.

The apparatus illustrated is for dispensing bags from an "overhead" position and as such it is desirable that means such as rollers, suction cups or the like be provided so a bag can be suspended in the dispensing means 30 for manual release. In this embodiment, a cylinder driven suspension clamp-43 operates against an anvil face 44 to perform this function. In operation, the nip roll assembly 27 is controlled to advance the film 21, either continuously, intermittently or on an on-demand basis. The sealing and cutting head 28 is operable to seal and cut a selected length of film to produce bag after bag, and on an on-demand mode, the bag is subsequent manual release by clamp 43.

To form a bag, film 21 is advanced by the nip roller assembly 27, upper and lower jaws associated with the head 35 secure the film leaving a space between for cutter 37 to be advanced. The lower jaw makes a transverse seal in the film and the film is released in the form of a bag 31 by advancing cutter 37.

The clamp can be operated to clasp the sealed and released end of the bag 31 against anvil face 44. At that stage, the end of the bag 31 extends from the dispensing means 30.

Figure 5:
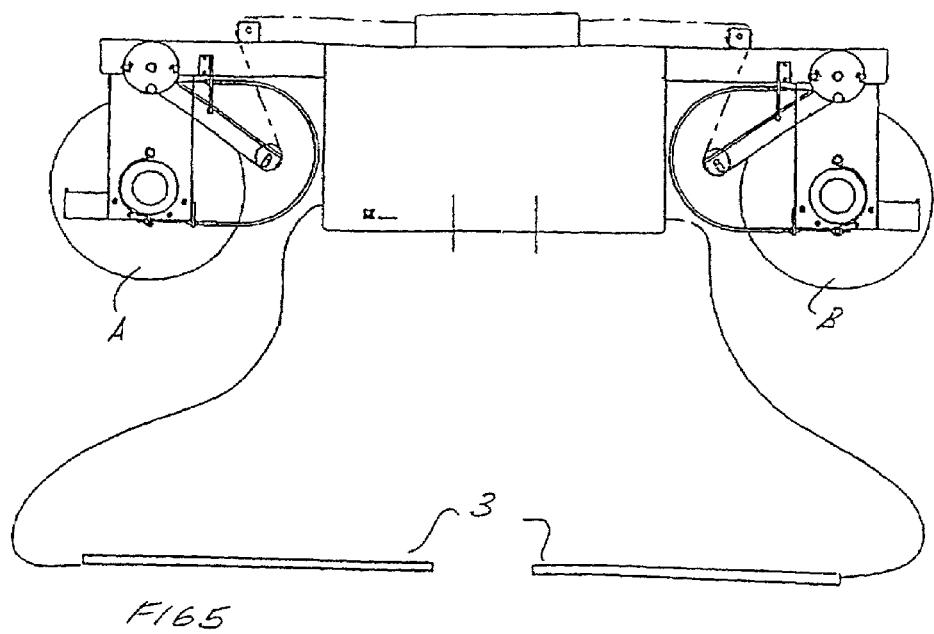
FIGS. 5 and 6 are diagrammatic elevations of other aspects of apparatus in accordance of the present invention.
Figure 6:
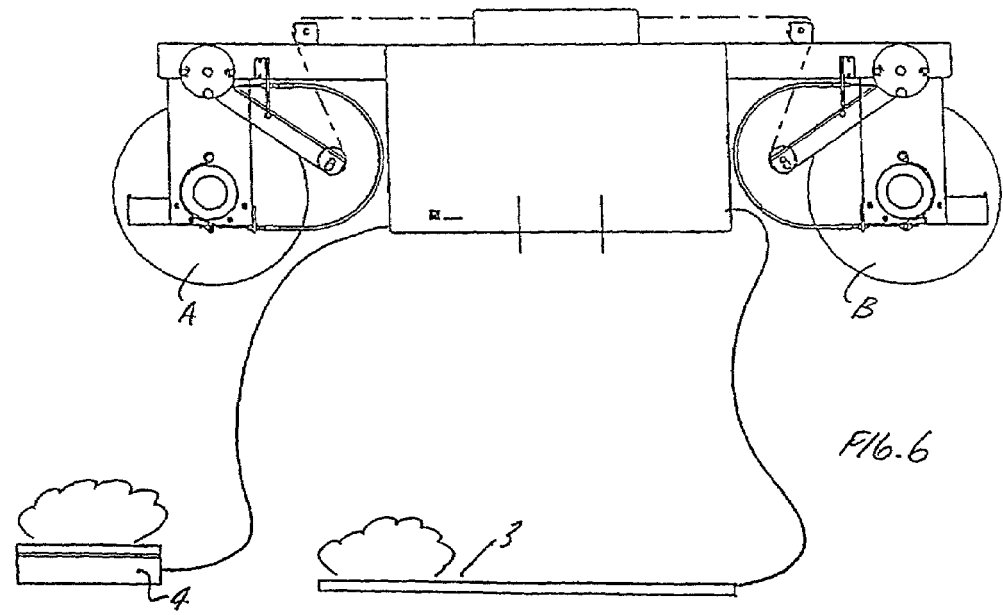

FIGS. 5 and 6 of the drawings illustrate various means by which bag selection and length can be made automatically or semi-automatically.

For example, in FIG. 5 length determining means 3 associated with control means (not shown) for determining bag length are provided. The device can be in a fixed position or can be free for an operator to position the same.

In another example illustrated by FIG. 6, a weighing device and length determining device is associated via control means with adjacent sealing and cutting heads 1.

The size input device may be a vision system, and may include photo eyes, proximity sensors and the like working independently or in conjunction with one another.

New Zealand Patent Application No. 286910/299534 describes one form of length measuring device which could be used with the present invention.

Figure 7:
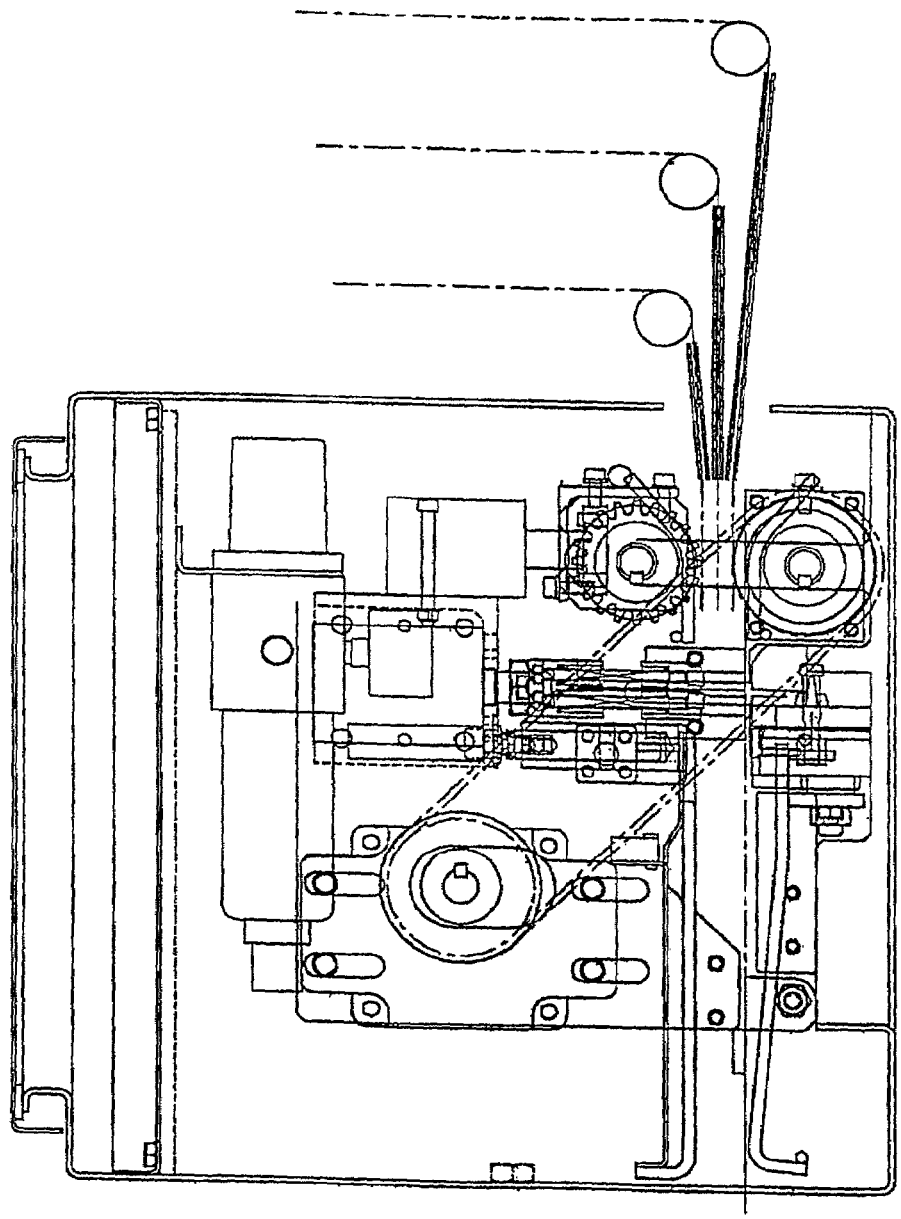
FIG. 7 is a detailed cross-sectional view of apparatus in accordance with another embodiment of the present invention.

FIG. 7 is a detailed cross-sectional view of mechanism of apparatus manufactured in accordance with one aspect of the present invention. In FIG. 7, it can be seen that three film sources may be used. In operation, two of the three guiding systems for the sources may be retracted (not shown) so that only the chosen film will be in contact with common nip rollers, sealing and cutting unit.

Aspects of the present invention have been described by way of example only and it should be appreciated that modifications and additions may be made thereto without departing from the scope thereof as defined in the appended claims.

What is claimed is:

1. An apparatus for making bags of varying sizes from thermoplastic material for packaging products of irregular size in a moving product stream, comprising means for machine assessing and acquiring information on one or more characteristics of size of products in the moving product stream, wherein the means for machine assessing and acquiring information comprises a remote sensing means; a first film source for supplying thermoplastic film in the form of a lay-flat film tube of a first width; a second film source for supplying thermoplastic film in the form of a lay-flat film tube of a second width; a printer; heat sealing means for making bags from the film sources by heat sealing across one or the other of the film sources near the end of the respective lay-flat film tube to form each bag; control means arranged to select one of the film sources based on the acquired size information related to each product, and to cause a bag to be made for each product to a length selected based on the acquired size information related to each product; and a printer shuttle which enables the printer to move to the selected lay-flat film tube.

2. The apparatus according to claim 1 wherein the means for machine assessing and acquiring information on one or more characteristics of size of products in the moving product stream comprises a machine vision system.

3. The apparatus according to claim 1 wherein the apparatus is arranged to produce a thermoplastic bag for a product arriving on a product conveying means, after removal of a previous thermoplastic bag.

4. The apparatus according to claim 1 wherein:
the means for machine assessing and acquiring information on one or more characteristics of size of products in the moving product stream comprises a vision system for assessing the size of meat cuts passing the vision system on the conveying means,
the first film source and the second film source comprise rolls of lay-flat thermoplastic film tube of a first width and a second width respectively, provided at a packing station which also includes heat sealing and cutting means for making bags by heat sealing and cutting across film from the film rolls to form bags; and the control means is arranged to cause a bag to be made for each meat cut approaching the packing station from a selected one of the film rolls of a first width and a second width respectively, and to cause the bag to be made to a length based on size information from the vision system relating to the approaching meat cut, and to cause the bag to be presented for use in packing the meat cut, after a previous bag used for packing a previous meat cut has been removed.

5. The apparatus according to claim 1 which comprises a means for cutting the respective lay-flat film tube.

6. An apparatus for making bags of varying sizes from thermoplastic material for packaging products of irregular size in a moving product stream, comprising means for machine assessing and acquiring information on one or more characteristics of size of products in the moving product stream, wherein the means for machine assessing and acquiring information comprises a remote sensing means; a first film source for supplying thermoplastic film in the form of a lay-flat film tube of a first width; a second film source for supplying thermoplastic film in the form of a lay-flat film tube of a second width; a printer; heat sealing means for making bags from the film sources by heat sealing across one or the other of the film sources near the end of the respective lay-flat film tube to form each bag; control means arranged to select one of the film sources based on the acquired size information related to each product, and to cause a bag to be made for each product to a length selected based on the acquired size information related to each product; and a means for moving film from the first or second film source to the printer.

7. The apparatus according to claim 6 wherein the means for machine assessing and acquiring information on one or more characteristics of size of products in the moving product stream comprises a machine vision system.

8. The apparatus according to claim 6 wherein the apparatus is arranged to produce a thermoplastic bag for a product arriving on a product conveying means, after removal of a previous thermoplastic bag.

9. The apparatus according to claim 6 wherein:

the means for machine assessing and acquiring information on one or more characteristics of size of products in the moving product stream comprises a vision system for assessing the size of meat cuts passing the vision system on the conveying means;

the first film source and the second film source comprise rolls of lay-flat thermoplastic film tube of a first width and a second width respectively, provided at a packing station which also includes heat sealing and cutting means for making bags by heat sealing and cutting across film from the film rolls to form bags; and the control means is arranged to cause a bag to be made for each meat cut approaching the packing station from a selected one of the film rolls of a first width and a second width respectively, and to cause the bag to be made to a length based on size information from the vision system relating to the approaching meat cut, and to cause the bag to be presented for use in packing the meat cut, after a previous bag used for packing a previous meat cut has been removed.

10. The apparatus according to claim 6 which comprises a means for cutting the respective lay-flat film tube.

11. An apparatus for making bags of varying sizes from thermoplastic material for packaging meat cuts of irregular size in a moving product stream, comprising a machine vision system for assessing the size of meat cuts passing the vision system on a conveying means, wherein the machine vision system comprises a remote sensing means; a first film source for supplying thermoplastic film in the form of a lay-flat film tube of a first width; a second film source for supplying thermoplastic film in the form of a lay-flat film tube of a second width; a printer; heat sealing means for making bags from the film sources by heat sealing across one or the other of the film sources near the end of the respective lay-flat film tube to form each bag; and control means arranged to select one of the film sources based on the acquired size information related to each meat cut, and to cause a bag to be made for each meat cut to a length selected based on the acquired size information related to each meat cut;

wherein the apparatus is arranged to produce a thermoplastic bag for a meat cut arriving on a product conveying means, after removal of a previous thermoplastic bag; and wherein the apparatus comprises either a printer shuttle which enables the printer to move to the selected lay-flat film tube, or a means for moving film from the first or second film source to the printer.

12. A method of making bags for packing meat cuts comprising:

a) remotely machine assessing at least one characteristic indicative of the size of individual meat cuts in a series of meat cuts in a moving product stream;

b) automatedly making a bag for each meat cut by selecting via a control means and based on the acquired size information related to each meat cut, one of at least a first source or second film source of lay-flat thermoplastic film tube of different widths;

c) moving the film of lay-flat thermoplastic film tube from the selected film source to a printer;

d) printing the film of lay-flat thermoplastic film tube; and e) sealing and cutting a length of the selected lay-flat thermoplastic film tube based on the acquired size information related to each meat cut, to cause a bag to be made for each meat cut.

13. A method of making bags for packing meat cuts comprising:

a) remotely machine assessing at least one characteristic indicative of the size of individual meat cuts in a series of meat cuts in a moving product stream;

b) automatedly making a bag for each meat cut by selecting via a control means and based on the acquired size information related to each meat cut, one of at least a first source or second film source of lay-flat thermoplastic film tube of different widths;

c) providing a printer;

d) moving a printer shuttle means to the selected film source of lay-flat thermoplastic film tube;

e) printing the film of lay-flat thermoplastic film tube; and f) sealing and cutting a length of the selected lay-flat thermoplastic film tube based on the acquired size information related to each meat cut, to cause a bag to be made for each meat cut.

* * * * *